US00RE41188E

(19) United States
(12) Reissued Patent
Lurie et al.

(10) Patent Number: US RE41,188 E
(45) Date of Reissued Patent: Apr. 6, 2010

(54) PLUNGER LOCK ASSEMBLY WITH REMOVABLE CORE

(75) Inventors: Alan E. Lurie, Centerport, NY (US); Joseph Thomas, Centerport, NY (US); William H. Bullwinkel, Plainview, NY (US)

(73) Assignee: Kenstan Lock Company, Plainview, NY (US)

(21) Appl. No.: 11/881,133

(22) Filed: Jul. 25, 2007

Related U.S. Patent Documents

Reissue of:
(64) Patent No.: 6,920,770
Issued: Jul. 26, 2005
Appl. No.: 10/859,386
Filed: Jun. 1, 2004

U.S. Applications:
(60) Provisional application No. 60/475,046, filed on Jun. 3, 2003.

(51) Int. Cl.
*E05B 65/08* (2006.01)
*E05B 33/00* (2006.01)

(52) U.S. Cl. ..... 70/100; 70/360; 70/369; 70/371

(58) Field of Classification Search ..... 70/95–100, 70/360, 361, 367–371; 292/DIG. 37
See application file for complete search history.

(56) References Cited

U.S. PATENT DOCUMENTS 1,342,728 A * 6/1920 Welch ..... 70/252
1,736,900 A * 11/1929 Carpenter ..... 70/185
1,951,418 A * 3/1934 Jacobi ..... 70/360
3,102,411 A * 9/1963 Friedman ..... 70/100
3,345,838 A * 10/1967 Russell et al. ..... 70/100
3,668,906 A * 6/1972 Josephart ..... 70/90
3,798,935 A * 3/1974 Blekking et al. ..... 70/100
4,009,599 A * 3/1977 Patriquin ..... 70/90
4,055,973 A * 11/1977 Best ..... 70/58
4,075,878 A * 2/1978 Best ..... 70/49
4,444,034 A * 4/1984 Best et al. ..... 70/369
4,489,576 A * 12/1984 Mullich et al. ..... 70/134
4,531,389 A * 7/1985 Foshee ..... 70/372
4,531,390 A * 7/1985 Best et al. ..... 70/372
4,565,080 A * 1/1986 Kincaid et al. ..... 70/215
4,573,334 A * 3/1986 Crepinsek ..... 70/451
4,583,381 A * 4/1986 Sjogren ..... 70/95
4,616,394 A * 10/1986 Best et al. ..... 29/436
4,633,690 A * 1/1987 Foshee ..... 70/451
4,656,849 A * 4/1987 Rotondi et al. ..... 70/134
4,663,839 A * 5/1987 Foshee ..... 29/804
4,683,736 A * 8/1987 Weinerman et al. ..... 70/208
4,696,174 A * 9/1987 Marks ..... 70/451
4,708,007 A * 11/1987 Stoia ..... 70/451
4,715,201 A * 12/1987 Craig ..... 70/369
4,722,204 A * 2/1988 Foshee ..... 70/100
4,761,978 A * 8/1988 Walla ..... 70/367
4,768,360 A * 9/1988 Foshee ..... 70/100
4,809,525 A * 3/1989 Cox ..... 70/100

(Continued)

*Primary Examiner*—Lloyd A Gall
(74) *Attorney, Agent, or Firm*—Carter, DeLuca, Farrell & Schmidt, LLP

(57) ABSTRACT

A plunger lock assembly having a removable core is provided. The lock assembly includes a housing defining a first longitudinal bore and a barrel reciprocably mounted within the first longitudinal bore between an advanced position and a retracted position. The barrel defines a second longitudinal bore and is operably associated with a plunger. A core is removable mounted within the second longitudinal bore of the barrel and includes a key slot for receiving an operating key. A drive member is positioned within the second longitudinal bore and is movable from an unlocked position to a locked position by operation of the operating key. A retainer assembly is operably associated with the drive member to axially retain the drive member within the second longitudinal bore such that the core is removable from the second longitudinal bore independently of the drive member. A biasing member is provided for urging the barrel towards the retracted position.

18 Claims, 9 Drawing Sheets

U.S. PATENT DOCUMENTS 4,836,001 A * 6/1989 Foshee ..... 70/368
4,843,852 A * 7/1989 Foshee et al. ..... 70/367
4,850,209 A * 7/1989 Weinerman et al. ..... 70/208
4,854,140 A * 8/1989 Goodman ..... 70/100
4,899,563 A * 2/1990 Martin ..... 70/367
4,914,932 A * 4/1990 Walla ..... 70/367
4,920,774 A * 5/1990 Martin ..... 70/367
4,981,027 A * 1/1991 Friedman et al. ..... 70/358
5,029,460 A * 7/1991 Anastasiou ..... 70/451
5,038,589 A * 8/1991 Martin ..... 70/368
5,070,715 A * 12/1991 Smallegan et al. ..... 70/369
5,121,618 A * 6/1992 Scott ..... 70/367
5,121,619 A * 6/1992 Martin ..... 70/371
5,168,734 A * 12/1992 Duval et al. ..... 70/369
5,209,087 A * 5/1993 Cox ..... 70/369
5,226,304 A * 7/1993 Scott ..... 70/369
5,233,851 A * 8/1993 Florian ..... 70/367
5,249,443 A * 10/1993 Anderson ..... 70/370
5,251,467 A * 10/1993 Anderson ..... 70/370
5,291,767 A * 3/1994 Weindorf et al. ..... 70/370
5,335,525 A * 8/1994 Solovieff ..... 70/370
5,351,513 A * 10/1994 Ellis ..... 70/370
5,421,179 A * 6/1995 Bergstrom ..... 70/369
5,479,800 A * 1/1996 Myers ..... 70/365
5,491,993 A * 2/1996 Anderson ..... 70/367
5,499,518 A * 3/1996 Shieh ..... 70/233
5,551,263 A * 9/1996 Myers et al. ..... 70/86
5,606,880 A * 3/1997 Viggiano ..... 70/86
5,634,359 A * 6/1997 Huebschen ..... 70/379 R
5,657,652 A * 8/1997 Martin ..... 70/85
5,678,437 A * 10/1997 Walla
5,678,438 A * 10/1997 Kolkman et al. ..... 70/370
5,685,184 A * 11/1997 Gallagher ..... 70/358
5,722,275 A * 3/1998 Price et al. ..... 70/379 R
5,724,840 A * 3/1998 DiVito ..... 70/371
5,737,950 A * 4/1998 Yun-Bin ..... 70/379 R
5,752,400 A * 5/1998 Kim ..... 70/368
5,775,145 A * 7/1998 Kasper ..... 70/367
5,848,540 A * 12/1998 Pieper ..... 70/252
5,884,512 A * 3/1999 Wayne ..... 70/370
5,907,963 A * 6/1999 Myers et al. ..... 70/371
5,931,035 A * 8/1999 Bolton ..... 70/367
5,970,760 A * 10/1999 Shen ..... 70/371
6,012,311 A * 1/2000 Duckwall ..... 70/369
6,067,827 A * 5/2000 Haseley et al. ..... 70/370
6,109,080 A * 8/2000 Chen et al. ..... 70/371
6,122,943 A * 9/2000 DaWalt et al. ..... 70/100
6,164,098 A * 12/2000 Hommes ..... 70/78
6,382,006 B1 * 5/2002 Field et al. ..... 70/371
6,412,317 B1 * 7/2002 Martin ..... 70/81
6,439,015 B1 * 8/2002 Sauerland et al. ..... 70/368
6,442,986 B1 * 9/2002 Russell et al. ..... 70/278.3

* cited by examiner

PLUNGER LOCK ASSEMBLY WITH REMOVABLE CORE

Matter enclosed in heavy brackets [ ] appears in the original patent but forms no part of this reissue specification; matter printed in italics indicates the additions made by reissue.

This application claims priority from U.S. provisional patent application Ser. No. 60/475,046, filed [May 30, 2003] *Jun. 3, 2003*, the entirety of which is incorporated herein by reference.

BACKGROUND

1. Technical Field

The present disclosure relates to a lock assembly. More particularly, the present disclosure relates to a plunger lock assembly having a removable core.

2. Background to Related Art

Lock assemblies having removable cores are well known in the art. By providing a removable core on a lock assembly, replacement of the entire lock assembly is not required if, for example, a key is lost or misplaced. Rather, only the removable core need be replaced and this can be accomplished quickly and inexpensively using a control key in a manner also known in the art. Thus, the use of removable core lock assemblies results in savings in both time and expense. These savings may be substantial where many locks are used on a daily basis such as in a department store.

Plunger locks are also well known. Currently, plunger locks having removable cores are not available. As such, when a key is lost, the entire plunger lock assembly must be removed from a support structure, e.g., a door, and replaced at considerable loss of time and expense.

Accordingly, a continuing need exists in the art for removable core plunger locks.

SUMMARY

A plunger lock assembly having a removable core is provided. The lock assembly includes a housing defining a first longitudinal bore and a barrel reciprocably mounted within the first longitudinal bore between an advanced position and a retracted position. The barrel defines a second longitudinal bore and is operably associated with a plunger. A core is removably mounted within the second longitudinal bore of the barrel and includes a key slot for receiving an operating key. A drive member is positioned within the second longitudinal bore and is movable from an unlocked position to a locked position by operation of the operating key. A retainer assembly is operably associated with the drive member to axially retain the drive member within the second longitudinal bore such that the core is removable from the second longitudinal bore independently of the drive member. A biasing member is provided for urging the barrel towards the retracted position.

The plunger may be fixedly attached to the barrel and movable from a retracted position located within the housing to an extended position extending from the housing. Alternately, the plunger may be fixedly attached to the drive member and rotatable therewith in relation to the barrel.

In one embodiment, the drive member includes an eccentric cam which is received within a cam slot in a bolt to drive the bolt between retracted and extended positions. The bolt extends through slots in the housing and the barrel in its extended position to lock the plunger in its advanced position. In an alternate embodiment, the plunger may include a cutout. When the plunger is rotated to the locked position, the cutout moves into engagement with the housing to lock the plunger in its advanced position.

In one embodiment, the drive member includes at least one bore and the retainer assembly includes a biasing member and a detent which are positioned in the at least one bore. The second longitudinal bore of the barrel includes an annular channel for receiving the detent to axially retain the drive member within the second longitudinal bore.

The plunger may also include a lateral extension for preventing removal of the plunger from a strike plate opening of a door when the plunger has been rotated to the locked position.

BRIEF DESCRIPTION OF THE DRAWINGS

Various preferred embodiments of the presently disclosed plunger lock assembly with removable core are described herein with reference to the drawings, wherein.

DETAILED DESCRIPTION OF EMBODIMENTS

Figure 1:
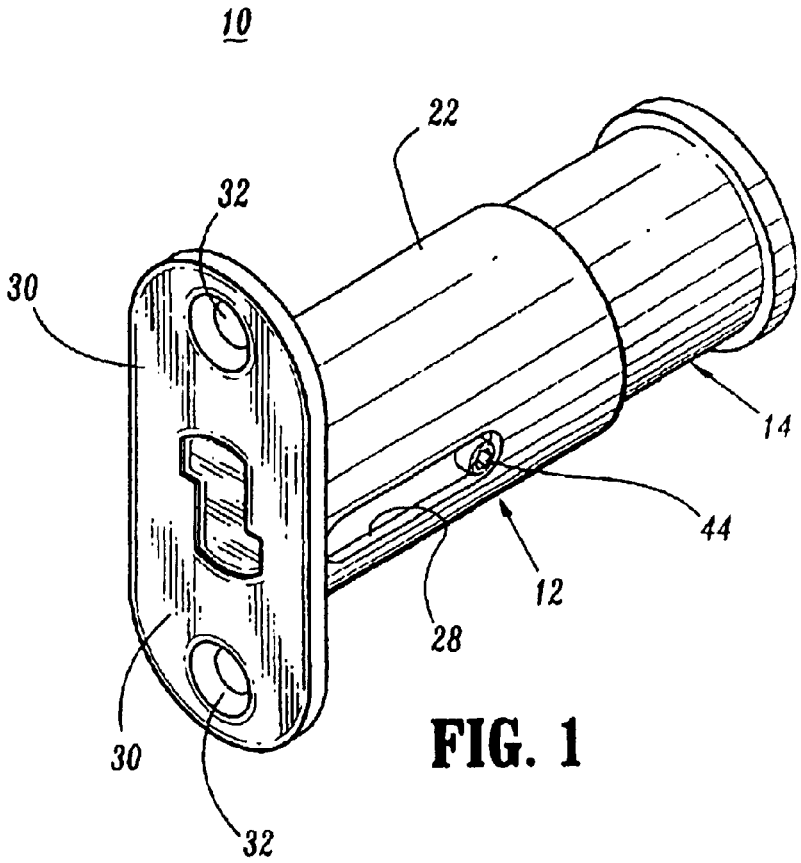
FIG. 1 is a side perspective view from the rear end of the presently disclosed plunger lock assembly with the plunger in its retracted position.

Various embodiments of the presently disclosed plunger lock assembly with removable core will now be described in detail with reference to the drawings, wherein like reference numerals designate identical or corresponding elements in each of the several views.

FIGS. 1–13 illustrate one embodiment of the presently disclosed plunger lock assembly with removable core shown generally as 10. Briefly, plunger lock assembly 10 includes a housing 12, a barrel 14, a biasing member 16, a removable core 18, a drive member 20, and a bolt 21. Barrel 14 is slidably positioned within lock housing 12 between an advanced and a retracted position as will be described in more detail below.

Lock housing 12 includes a body portion 22 and a baseplate 24. Body portion 22 defines a cylindrical bore 26 for reciprocably receiving barrel 14. A longitudinal slot 28 is formed through a sidewall of body portion 22. The purpose of slot 28 will be described in detail below. Baseplate 24 includes a pair of radially extending wings 30. Each wing 30 includes an opening 32 dimensioned to receive a fastening member, e.g., a screw, for securing housing 12 to a support structure, e.g., a door. Baseplate 24 also includes a plunger throughbore 34 which communicates with cylindrical bore 26. Plunger throughbore 34 is dimensioned to slidably receive a plunger 40 of barrel 14 as will be described in detail below.

Figure 2:
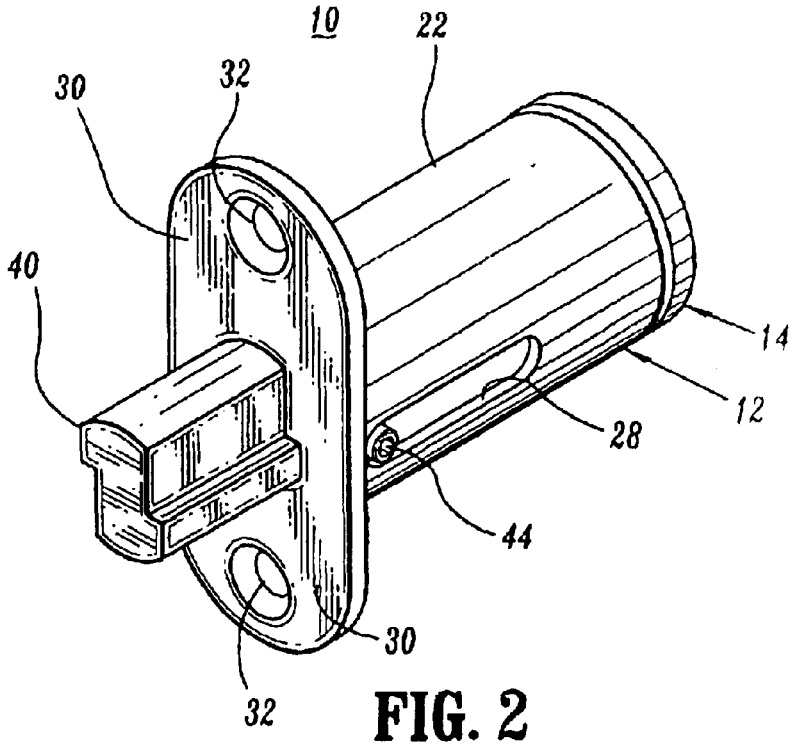
FIG. 2 is a side perspective view from the rear end of the plunger lock assembly shown in FIG. 1 with the plunger in its advanced position.
Figure 3:
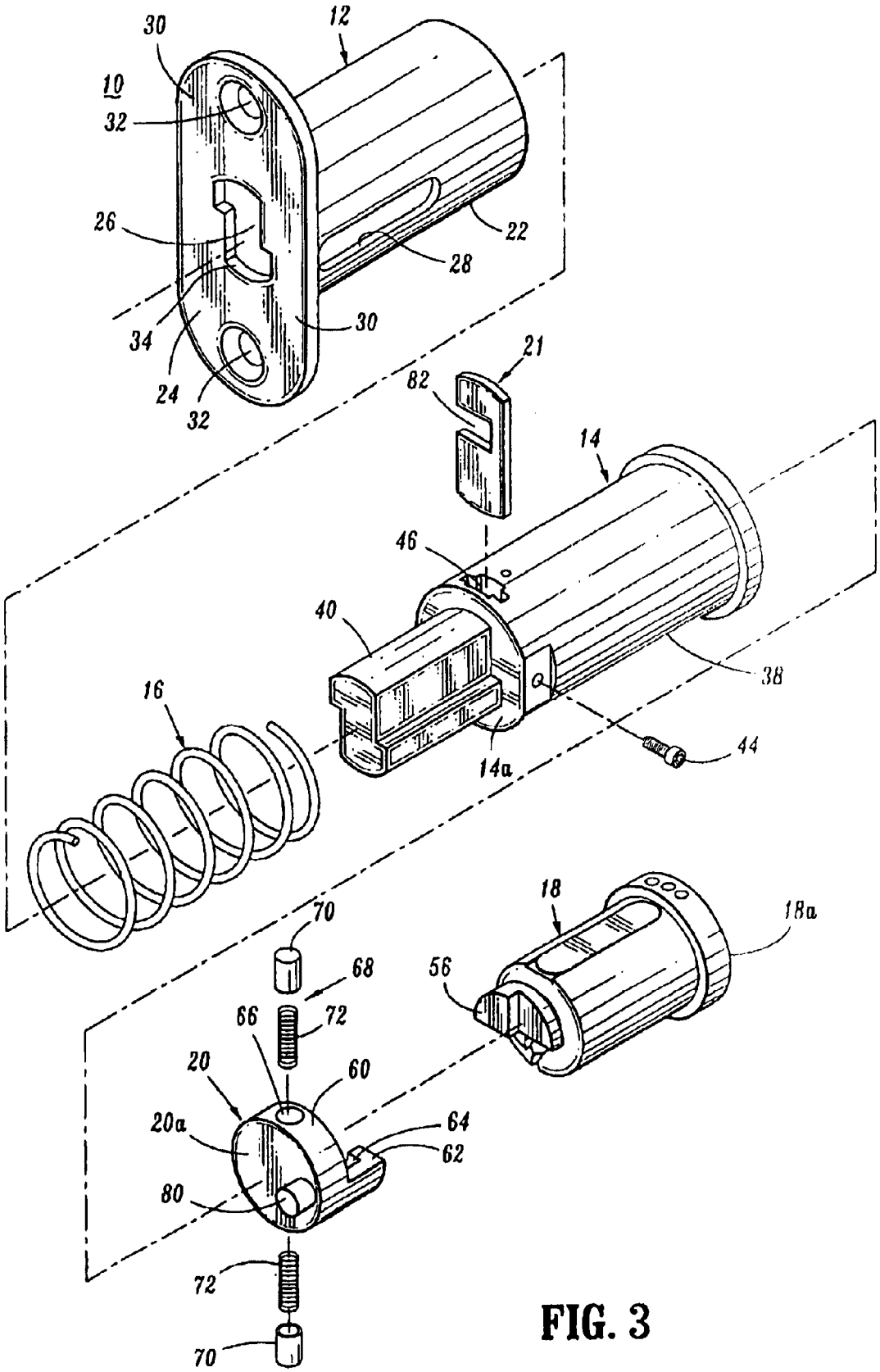
FIG. 3 is a side perspective view from the rear end, with parts separated, of the plunger lock assembly shown in FIG. 2.
Figure 4:
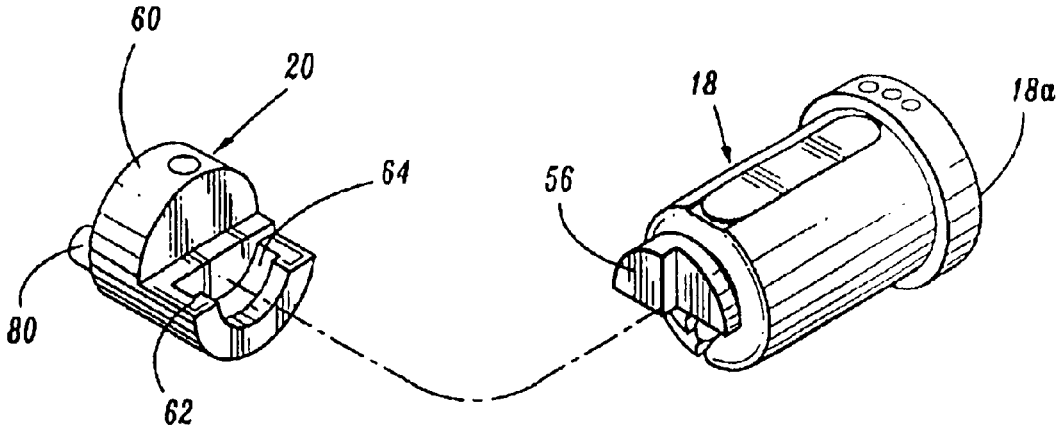
FIG. 4 is a side perspective view, with parts separated, of the removable core and drive member of the plunger lock assembly shown in FIG. 3.

Barrel 14 includes a substantially cylindrical body portion 38 defining a bore 47 (FIG. 5) dimensioned to receive removable core 18, drive member 20 and bolt 21. Barrel 14 also includes plunger 40 which is dimensioned to extend through plunger throughbore 34. In one embodiment, plunger 40 and plunger throughbore 34 have a non-circular configuration, e.g., a Z-configuration, to provide a tighter fit between plunger 40 and throughbore 34. A guide screw 44 is secured via threads to a rear end of cylindrical body portion 38. Guide screw 44 is slidably positioned within longitudinal slot 28 to prevent rotation of barrel 14 within cylindrical bore 26 of lock housing 12, and to provide a stop member for defining the advanced and retracted positions of plunger 40. The rear end of cylindrical body portion 38 of barrel 14 includes diametrically opposed slots 46 which are aligned with corresponding slots 48 (FIG. 10) formed in lock housing 12. Slots 46 and 48 are dimensioned to slidably receive bolt 21 such that when bolt 21 is positioned through slots 46 and 48, plunger 40 is retained in its advanced position (FIG. 2).

Biasing member 16, which may be a coil spring is positioned about plunger 40 between a rear face 14a of barrel 14 and an inner surface of baseplate 24 of lock housing 12. Biasing member 16 urges barrel 14 including plunger 40 to its retracted position.

Removable core 18 is rotatably and slidably positioned within bore 47 of barrel 14. The front end 18a of removable core 18 includes a key slot 50 (FIG. 10) for receiving an operating key 52 (FIGS. 8 and 9) and a control key 54 (FIGS. 6 and 7) as will be discussed in further detail below. The rear end of removable core 18 includes a first engagement member 56 for releasably engaging drive member 20.

Drive member 20 includes a substantially cylindrical body portion 60 having a second engagement member 62 formed on a front end thereof. Second engagement member 62 includes a semi-circular recess 64 (FIG. 4) releasably receiving first engagement member 56 of removable core 18. Alternately, other configurations may be provided to releasably engage removable core 18 to drive member 20.

Figure 5:
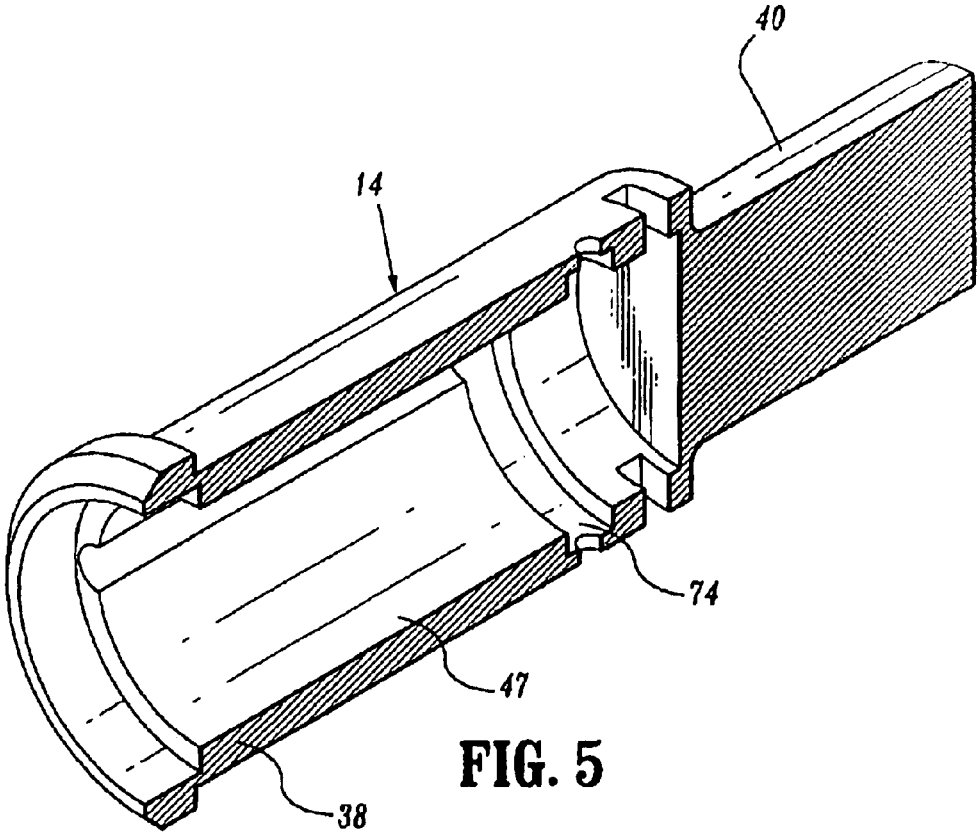
FIG. 5 is a side perspective cross-sectional view of the barrel of the plunger lock assembly shown in FIG. 3.
Figure 6:
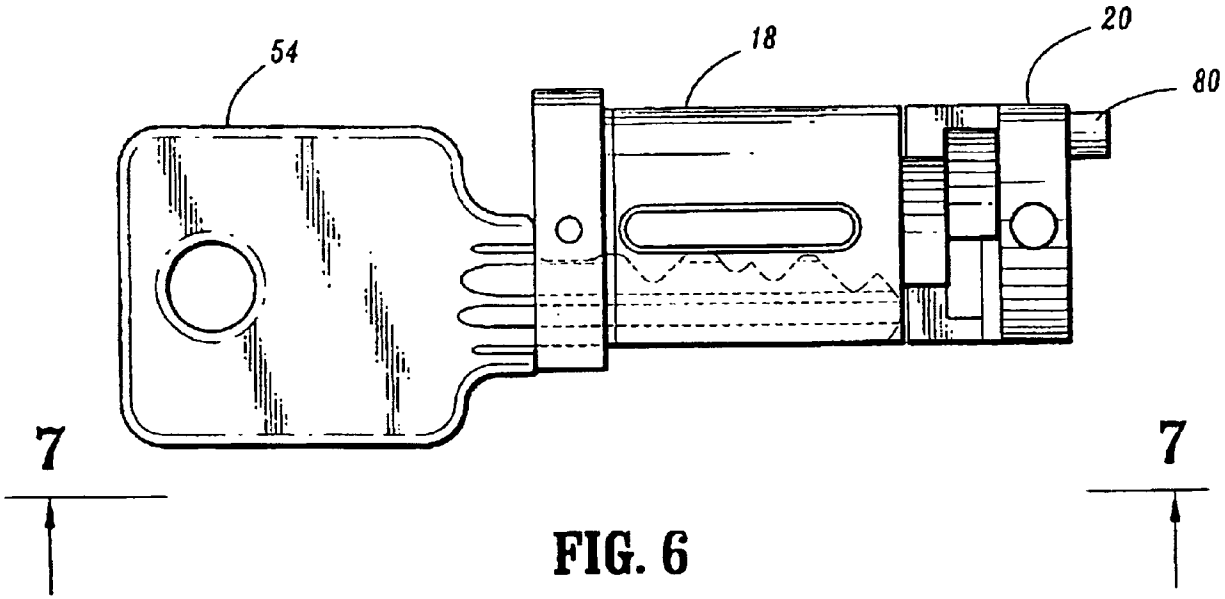
FIG. 6 is a side view of the removable core and drive member of the plunger lock assembly shown in FIG. 3 with a control key inserted in the key slot of the removable core.
Figure 7:
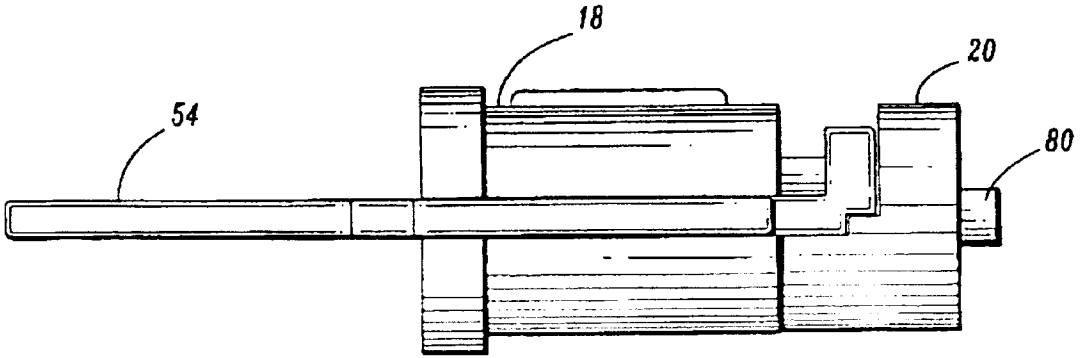
FIG. 7 is a side view of the removable core and drive member taken in the direction of line 7—7 shown in FIG. 6.

Drive member 20 includes a pair of diametrically opposed blind bores 66. A retainer assembly 68 including a detent 70 and a biasing member 72 is received in each blind bore 66. Biasing member 72, which may be a coil spring, is positioned to urge detent 70 outwardly into an annular channel 74 formed within cylindrical body portion 38 (FIG. 5). Retainer assemblies 68 retain drive member 20 within bore 47 of cylindrical body portion 38. Drive member 20 can be loaded into cylindrical body portion 38 by pressing detents 70 against the bias of springs 72 into bores 66 and sliding drive member 20 along bore 47 of cylindrical body portion 38 until detents 70 pass over annular channel 74. At such time, springs 72 will urge detents 70 outwardly into channel 74 and drive member 20 will be axially retained within barrel 14.

Figure 11:
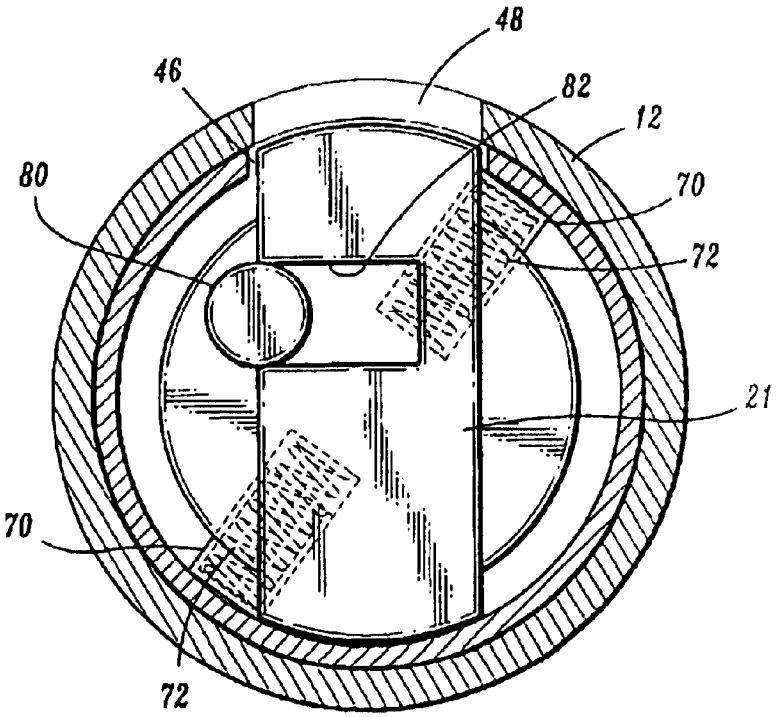
FIG. 11 is a cross-sectional view taken along section lines 11—11 of FIG. 10.
Figure 12:
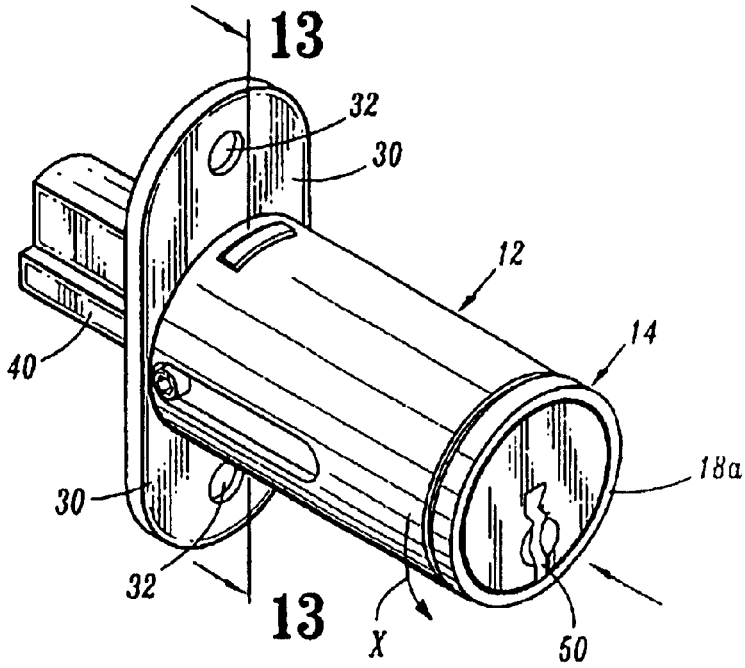
FIG. 12 is a side perspective view from the front end of the plunger lock assembly shown in FIG. 2.
Figure 13:
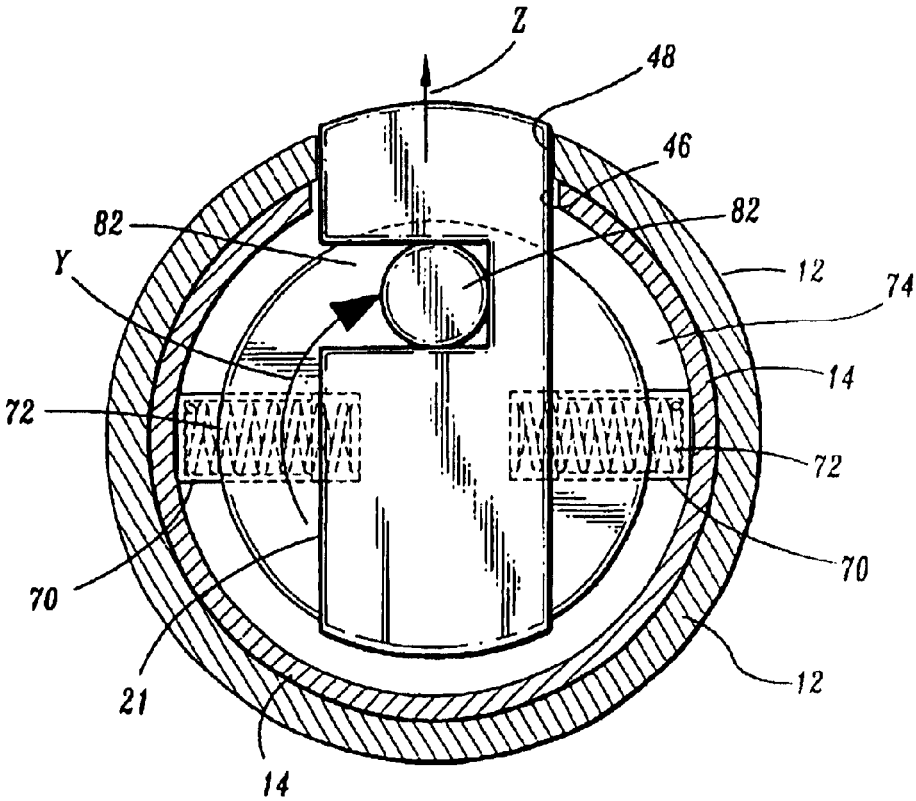
FIG. 13 is a cross-sectional view taken along section lines 13—13 of FIG. 12.
Figure 14:
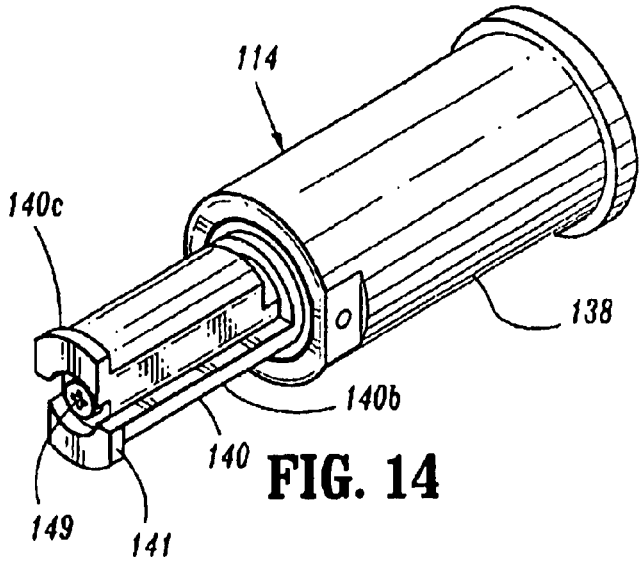
FIG. 14 is a perspective view from the rear end of the barrel and plunger of another embodiment of the presently disclosed plunger lock assembly.
Figure 15:
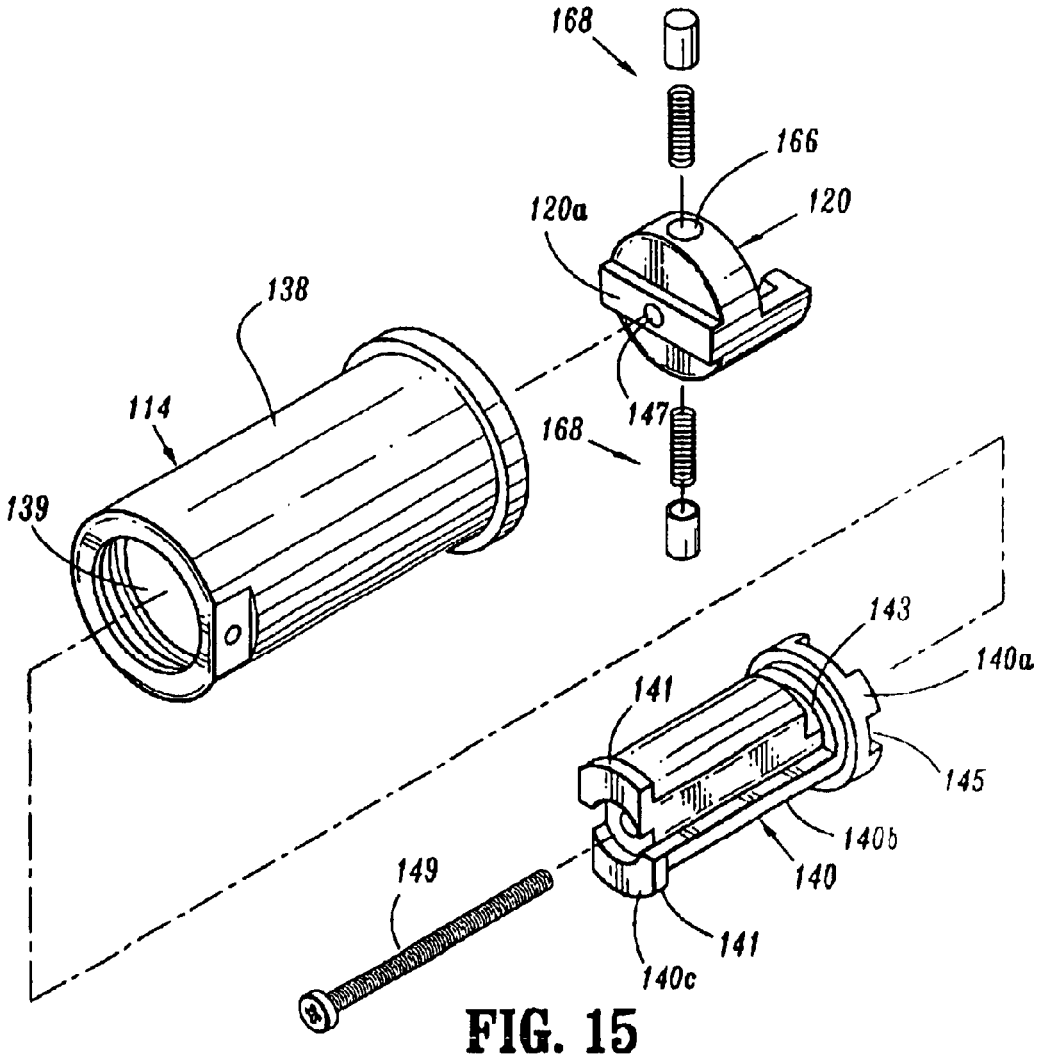
FIG. 15 is a perspective view from the rear end with parts separated of the barrel, plunger and drive member of the plunger lock assembly shown in FIG. 14.
Figure 16:
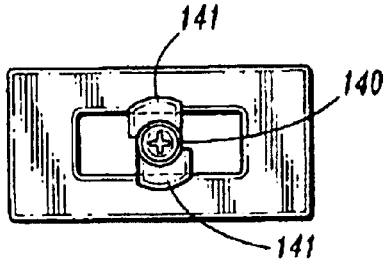
FIG. 16 is a rear view of the plunger as it extends through a strike plate.

A distal face 20a of drive member 20 includes a cam member 80 which is dimensioned to be slidably received within a cam slot 82 formed in bolt 21 (FIG. 11). Cam member 80 is eccentrically mounted on distal face 20a such that rotation of drive member 20 within bore 47 of barrel 14 is translated to linear movement of bolt 21.

In use, when bolt 21 is in its unlocked or non-extended position (FIGS. 10 and 11), i.e., bolt 21 is positioned within bore 47 of barrel 14 and does not extend through slot 48 of lock housing 12, biasing member 16 urges barrel 14 and plunger 40 to their retracted position. In the retracted position, plunger 40 is positioned Within lock housing 12. Note that guide screw 44 is positioned at the front end of longitudinal slot 28. When an operating key is inserted into key slot 50 (FIG. 12) and rotated to rotate removable core 18 in the direction indicated by arrow "X" in FIG. 12, drive member 20 is rotated in the direction indicated by arrow "Y" in FIG. 13. When drive member 20 is rotated, cam member 80 is moved in relation to bolt 21 to move bolt 21 in the direction indicated by arrow "Z" in FIG. 13 to its extended position. In its extended position, bolt 21 extends through slots 46 and 48 formed in barrel 14 and lock housing 12, respectively to lock barrel 14 including plunger 40 in their advanced position.

Figure 8:
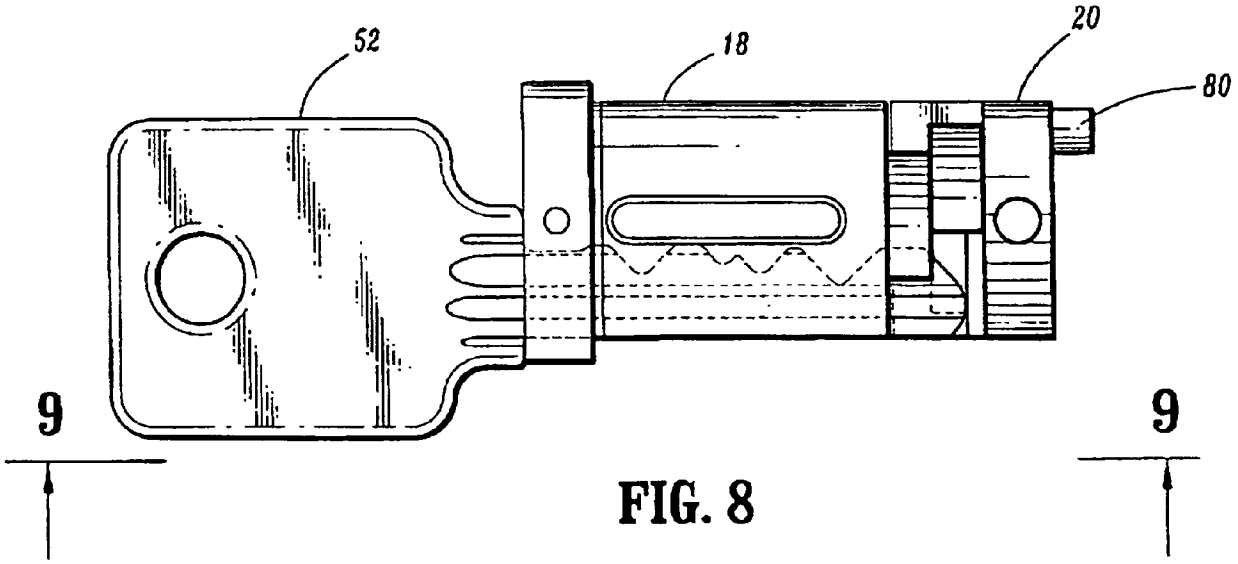
FIG. 8 is a side view of the removable core and drive member of the plunger lock assembly shown in FIG. 3 with an operating key inserted in the key slot of the removable core.
Figure 9:
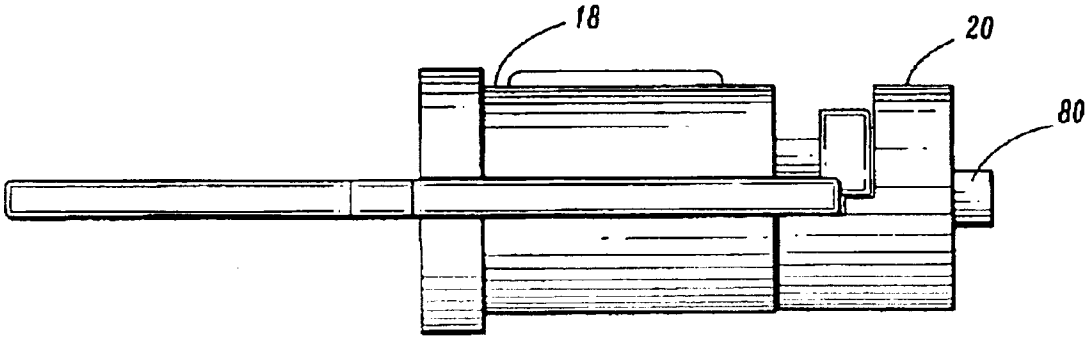
FIG. 9 is a side view taken in the direction of line 9—9 in FIG. 8.
Figure 10:
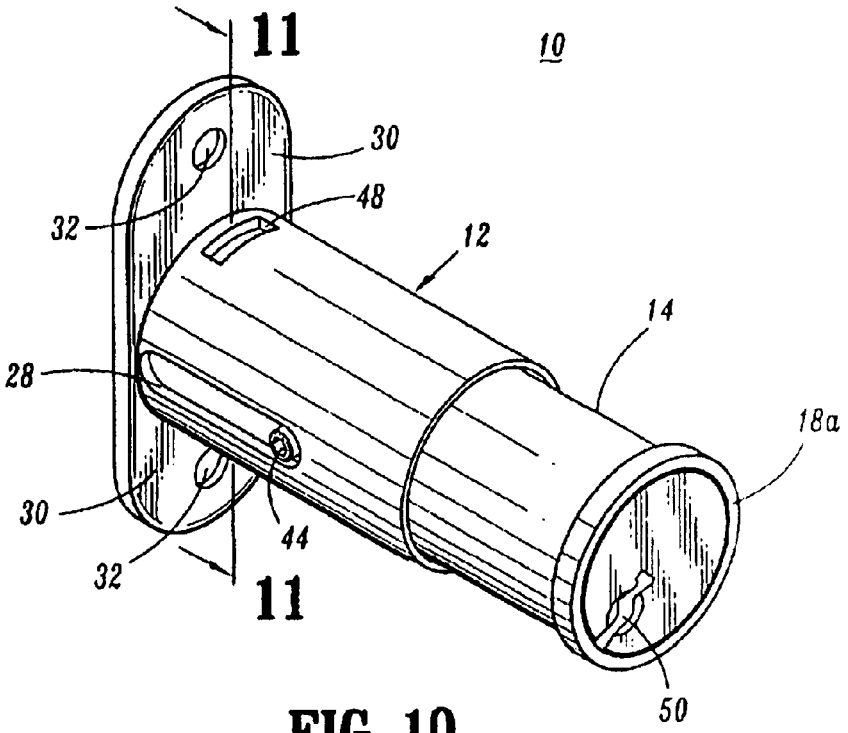
FIG. 10 is a side perspective view from the front end of the plunger lock assembly shown in FIG. 1.

As discussed above, the presently disclosed lock assembly includes a removable core 18. Removable core 18 can be removed from barrel 14 using a control key 54. Control key 54, shown in FIGS. 6 and 7, when inserted in key slot 50, extends substantially the length of removable core 18 and does not engage the drive member 20. When control key 54 is rotated, removable core 18 is rotated independently of drive member 20 to disengage first engagement member 56 of removable core 18 from second engagement member 62 of drive member 20 to facilitate removal of removable core 18 from barrel 14 independently of drive member 20 and bolt 21. Operation of bolt 21 is effected using operating key 52 (FIGS. 8 and 9). Operating key 52 extends beyond the rear end of removable core 18 into engagement with drive member 20 such that rotation of removable core 18 and operating key 52 effects rotation of drive member 20, and thus, movement of bolt 21.

Plunger locks are typically used on sliding doors of display cabinets. When the plunger is extended, it is positioned to prevent one door from sliding in relation to the other door. Attempts have been made to defeat the function of the plunger lock as used on sliding doors by pushing a first sliding door away from the second sliding door on which the lock assembly is mounted, to slide the first sliding door by the plunger. A second embodiment of the presently disclosed plunger lock assembly disclosed below addresses this problem.

Figure 17:
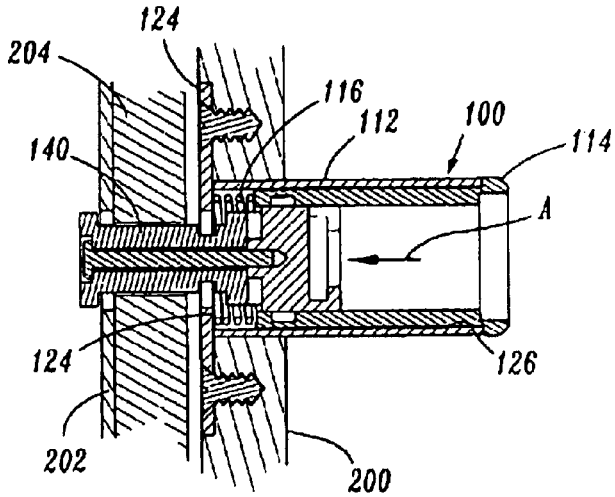
FIG. 17 is a side cross-sectional view of the plunger lock assembly supported on a first door with the plunger extending through a strike plate supported on a second door.
Figure 18:
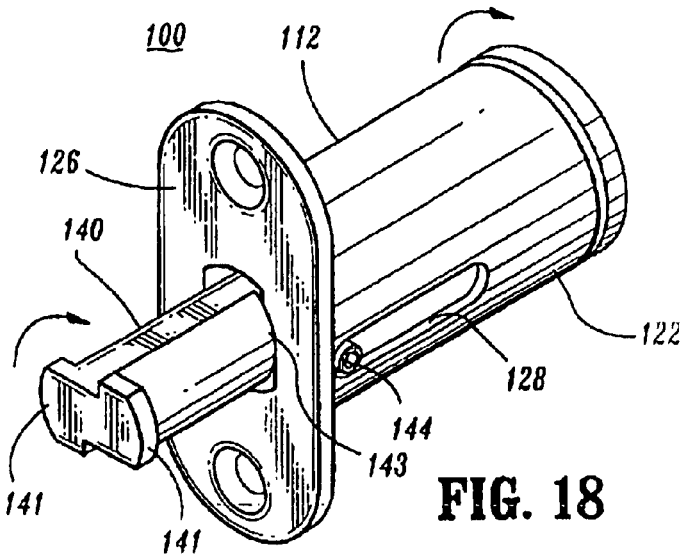
FIG. 18 is a side perspective view from the rear end of the plunger lock assembly shown in FIG. 17 with the plunger rotated to the locked position.

Referring to FIGS. 14–18, a second embodiment of the presently disclosed plunger lock assembly with removable core is shown generally as 100 (FIG. 18). Lock assembly 100 is similar to lock assembly 10 with several exceptions which will be described in detail below.

Lock assembly 100 includes a lock housing 112 (FIG. 18) which has a body portion 122 defining a cylindrical bore 126 (FIG. 17) and a baseplate 124 for mounting lock housing 112 to a support structure. As will be evident below, lock housing 112 does not include diametrically opposed slots 48.

Barrel 114 includes a substantially cylindrical body portion 138 defining a bore 139 dimensioned to receive a removable core (not shown). Bore 139 is open at both its front and rear ends. Barrel 114 is slidably positioned within cylindrical bore 126 (FIG. 17) of lock housing 112. A guide screw 144 is secured to a rear end of body portion 138 (FIG. 18). As discussed above, guide screw 144 is slidably positioned within a longitudinal slot 128 formed in lock housing 112 to prevent rotation of barrel 114 within lock housing 112 and to define the advanced and retracted positions of barrel 114 in relation to lock housing 112. A biasing member 116 (FIG. 17) is positioned between baseplate 124 of lock housing 112 and the rear end of barrel 114 to urge barrel 114 to its retracted position.

A plunger 140 extends through the open rear end of barrel 114. Plunger 140 includes a first end 140a configured to engage a drive member 120, a central body portion 140b, and a second end 140c having a pair of lateral extensions 141. A cutout 143 is formed in central body portion 140b adjacent first end 140a.

Drive member 120 is substantially similar to drive member 20 disclosed above with a few exceptions which will be discussed herein. Drive member 120 includes a pair of diametrically disclosed bores 166 dimensioned to receive retainer assemblies 168 as discussed above. Drive member 120 also includes a raised protrusion 120a for engaging a slot 145 formed in the first end 140a of plunger 140, and a threaded bore 147. Threaded bore 147 is dimensioned to receive a threaded bolt 149 for securing first end 140a of plunger 140 directly to drive member 120.

The removable core (not shown) and drive member 120 interact as discussed above with respect to lock assembly 10 and will not be discussed in further detail herein.

In use, lock housing 112 is secured to a sliding door 200 (FIG. 17). When a key is inserted into the removable core of lock assembly 100 and barrel 114 is pushed in the direction indicated by arrow "A" in FIG. 17, plunger 140 is pushed from lock housing 112 and extends through a strike plate 202 secured to an adjacent sliding door 204. It is noted that both plunger 140 and the opening in strike plate 202 have a greater width dimension than height dimension (See FIG. 16). When plunger 140 is pushed through strike plate 202 and the key is rotated to rotate drive member 120 within barrel 114, plunger 140 is rotated with drive member 120. When plunger 140 is rotated, lateral extensions 141 extend beyond the height of the opening in strike plate 202 to prevent linear removal of plunger 140 from strike plate 202. Note also that cutout 143 in plunger 140, when rotated, receives a portion of baseplate 124 of lock housing 112 to lock plunger 140 in its advanced position.

By providing lateral extensions 141 on plunger 140, it is no longer possible to defeat lock assembly 100 by pushing sliding door 204 away from door 200. As is evident from FIG. 16, lateral extensions 141 prevent separation of sliding doors 200 and 204.

It will be understood that various modifications may be made to the embodiments disclosed herein. For example, the components of the lock assembly can be formed of any material having the required strength characteristics. Further, the configurations of the drive member, removable core and/or the actuator may varied from that shown without departing from the teachings of this disclosure. Therefore, the above description should not be construed as limiting, but merely as exemplifications of disclosed embodiments. Those skilled in the art will envision other modifications within the scope and spirit of the claims appended here to.

What is claimed is:

1. A plunger lock assembly comprising:

a housing defining a first longitudinal bore;

a barrel reciprocably mounted within the first longitudinal bore between an advanced position and a retracted position, the barrel defining a second longitudinal bore and being operably associated with a plunger;

a core removably mounted within the second longitudinal bore, the core including a key slot for receiving an operating key;

a drive member positioned within the second longitudinal bore, the drive member being releasably enageable with the core such that when the core is moved from an unlocked to a locked position, the drive member is moved from an unlocked to a locked position; and a retainer assembly operably associated with the drive member to axially retain the drive member within the second longitudinal bore, wherein the core is removable from the second longitudinal bore independently of the drive member.

2. A plunger lock assembly according to claim 1, further including a biasing member for urging the barrel toward retracted position.

3. A plunger lock assembly according to claim 2, wherein the plunger is fixedly attached to the barrel and movable from a retracted position located substantially within the lock housing to an advanced position extending from the lock housing.

4. A plunger lock assembly according to claim 3, further including a bolt having a cam slot wherein the drive member includes an eccentric cam member which is positioned within the cam slot, the drive member being movable to move the bolt between a retracted position and an extended position.

5. A plunger lock assembly according to claim 4, wherein the barrel and the housing each include a slot dimensioned to slidably receive the bolt, the bolt extending through the slots of the barrel and the housing in its extended position to lock the barrel and the plunger in their advanced positions.

6. A lock assembly according to claim 5, wherein the plunger has a non-circular configuration and the housing includes a plunger throughbore having a shape that corresponds to the configuration of the plunger.

7. A lock assembly according to claim 1, wherein the drive member includes at least one bore, the retainer assembly including a detent positioned within the drive member bore.

8. A lock assembly according to claim 7, wherein *the* barrel includes an annular channel formed about the second longitudinal bore, the detent extending into the annular channel to axially retain the drive member within the second longitudinal bore.

9. A lock assembly according to claim 8, wherein the retainer assembly further includes a biasing member for urging the detent from the drive member bore into the annular channel.

10. A lock assembly according to claim 9, wherein the drive member includes two diametrically opposed bores, wherein one retainer assembly is positioned in each of the drive member bores.

11. A lock assembly according to claim 2, wherein the plunger is secured to the drive member and rotatable in relation to the barrel.

12. A lock assembly according to claim 11, wherein the plunger includes a cutout, the cutout engaging a surface of the housing when the drive member is moved to its locked position to retain the plunger in its advanced position.

13. A lock assembly according to claim 12, wherein the rear end of the plunger includes at least one lateral extension for preventing removal of the plunger from a strike plate opening when the plunger is rotated to a locked position.

*14. A plunger lock assembly comprising:*

*a housing defining a longitudinal bore, the longitudinal bore configured to receive a core having a key slot for receiving an operating key;*

*a plunger reciprocably mounted within the longitudinal bore between an advanced position and a retracted position;*

*a drive member positioned within the longitudinal bore, the drive member being releasably engageable with the core such that when the core is moved from an unlocked to a locked position, the drive member is moved from an unlocked to a locked position;*

*a bolt having a cam slot, wherein the drive member includes an eccentric cam member which is positioned within the cam slot, the drive member being movable to move the bolt between a retracted position and an extended position; and*

*wherein the core is releasable from the longitudinal bore independently of the drive member.*

*15. A plunger lock assembly according to claim 14, wherein the housing includes a slot dimensioned to slidably receive the bolt, the bolt extending through the slot of the housing in its extended position to lock the plunger in its advanced position.*

*16. A plunger lock assembly according to claim 15, wherein the distal end of the plunger has a non-circular configuration and the housing includes a plunger through-bore having a shape that corresponds to the configuration of the plunger.*

*17. A plunger lock assembly comprising:*

*a housing defining a longitudinal bore, the longitudinal bore configured to receive a core having a key slot for receiving an operating key;*

*a plunger reciprocably mounted within the longitudinal bore between an advanced position in which a distal end of the plunger extends from the housing and a retracted position in which the distal end of the plunger is located substantially within the housing;*

*a drive member positioned within the longitudinal bore, the drive member being releasably engageable with the core such that when the core is moved from an unlocked to a locked position, the drive member is moved from an unlocked to a locked position, and the drive member including a semi-circular portion which is engagable with the core; and*

*wherein the core is releasable from the longitudinal bore independently of the drive member.*

*18. The plunger lock assembly of claim 17, wherein the semi-circular portion of the drive member is configured to engage a semi-circular portion of the core.*

* * * * *